United States Patent
Steiger et al.

(10) Patent No.: US 7,369,596 B2
(45) Date of Patent: May 6, 2008

(54) CHAMBER FOR A HIGH ENERGY EXCIMER LASER SOURCE

(75) Inventors: Thomas D Steiger, San Diego, CA (US); William N. Partlo, Poway, CA (US)

(73) Assignee: Cymer, Inc., San Diego, CA (US)

(*) Notice: Subject to any disclaimer, the term of this patent is extended or adjusted under 35 U.S.C. 154(b) by 45 days.

(21) Appl. No.: 11/447,502

(22) Filed: Jun. 5, 2006

(65) Prior Publication Data

US 2007/0280323 A1  Dec. 6, 2007

(51) Int. Cl.
*H01S 3/22* (2006.01)
*H01S 3/223* (2006.01)
*H01S 3/03* (2006.01)

(52) U.S. Cl. ............................. 372/55; 372/58; 372/65
(58) Field of Classification Search .................. 372/58, 372/65
See application file for complete search history.

(56) References Cited

U.S. PATENT DOCUMENTS

| 4,719,641 A * | 1/1988 | Muller et al. ............... 372/109 |
| 2002/0196830 A1* | 12/2002 | Ujazdowski et al. .......... 372/55 |

* cited by examiner

*Primary Examiner*—Minsun Oh Harvey
*Assistant Examiner*—Michael Pan
(74) *Attorney, Agent, or Firm*—Matthew K. Hillman

(57) ABSTRACT

A chamber for a gas discharge laser is disclosed and may include a chamber housing having a wall, the wall having an inside surface surrounding a chamber volume and an outside surface, the wall also being formed with an orifice. For the chamber, at least one electrical conductor may extend through the orifice to pass an electric current into the chamber volume. A member may be disposed between the conductor and the wall for preventing gas flow through the orifice to allow a chamber pressure to be maintained in the volume. The chamber may further comprise a pressurized compartment disposed adjacent to the orifice for maintaining a pressure on at least a portion of the outside surface of the wall to reduce bowing of the wall near the orifice due to chamber pressure.

14 Claims, 3 Drawing Sheets

CHAMBER FOR A HIGH ENERGY EXCIMER LASER SOURCE

FIELD OF THE INVENTION

The present invention relates to pulsed, gas discharge lasers. The present invention is particularly, but not exclusively useful as a chamber for a high pulse energy Excimer gas discharge laser.

BACKGROUND OF THE INVENTION

A typical gas discharge laser may employ a pair of spaced apart, elongated discharge electrodes to initiate lasing in a gaseous material. In one arrangement, aluminum, two-piece chamber housing is employed that envelops the gaseous gain media and the discharge region. In addition to containing the gain media, the housing typically acts as a mechanical support for the electrodes, and in some cases, an insulator which electrically separates at least one of the electrodes from the housing (which is typically grounded). Thus, the housing is required to be relatively stiff and rigid. For the case where the insulator, which is typically made of a relatively brittle ceramic, is mechanically coupled to the housing, deformation of the housing can place stresses on the insulator which can cause the insulator to flex, and in severe cases, crack. In addition to stresses from the housing, the insulator may also be subjected to stresses from thermal loading as well as thermal gradients produced by electrical tracking, a phenomenon known to occur in high power excimer discharge lasers.

For some types of lasers, e.g. pulsed excimer lasers, pulse energy can be increased by increasing the pressure of the gaseous gain media. This pressure, in turn, places additional stresses on the chamber housing which act to deform the housing. Moreover, the wall of the housing is typically formed with one or more through-holes to allow electrical conductors to pass to one of the electrodes. These holes can create a weakened region of the housing near the insulator which is particularly vulnerable to deformation. One way to provide a stiffer housing would be to make it out of a stronger material, e.g., steel, however this may result in an undesirable increase in weight and cost.

With the above considerations in mind, Applicants disclose a chamber for a high energy excimer laser source.

SUMMARY OF THE INVENTION

In a first aspect of an embodiment of the invention, a chamber for a gas discharge laser may comprise a chamber housing having a wall, the wall having an inside surface surrounding a chamber volume and an outside surface. The wall may also be formed with an orifice. For this aspect, the chamber may also comprise at least one electrical conductor extending through the orifice for passing electric current into the chamber volume and a member disposed between the conductor and the wall for preventing gas flow through the orifice to allow a chamber pressure to be maintained in the volume. The chamber may further comprise a pressurized compartment disposed adjacent the orifice for maintaining a pressure on at least a portion of the outside surface of the wall to reduce bowing of the wall near the orifice due to chamber pressure.

In one embodiment the flow prevention member may comprise a ceramic insulator and in a particular embodiment a compressible seal may be disposed between the ceramic insulator and the housing wall. In a particular implementation, the pressurized compartment may contain nitrogen gas.

In one application of this aspect, the gas discharge laser is an excimer laser, the conductor is in electrical communication with a discharge electrode, the gas pressure inside said chamber volume exceeds 500 kPa and the pressure inside the compartment exceeds 500 kPa.

In another aspect of an embodiment, a chamber for a gas discharge laser may comprise a chamber housing having a wall, the wall surrounding a pressurizable chamber volume and a pair of spaced apart discharge electrodes that are disposed in the chamber volume. For this aspect, the chamber may further include a ceramic insulator that is disposed in the volume and is coupled to a portion of the housing wall together with a means for reducing a pressure differential across the wall portion to reduce deformation of the insulator.

In one embodiment the wall portion may be formed with an orifice and in a particular embodiment the wall portion may be formed With a plurality of orifices with the chamber further comprising a plurality of electrical conductors, with each conductor extending through a respective orifice to pass electric current through the wall to one of the discharge electrodes. The insulator may be positioned between one of the electrodes and the wall portion. For this aspect, the reducing means may comprise a cover mounted on the wall portion to establish a compartment and a gas supply for pressurizing the compartment. In one particular implementation, the cover may be formed with an exit orifice to allow gas to flow through the cover to remove ozone buildup in the compartment.

In an additional aspect of an embodiment, a method for producing a laser beam may comprise the steps of providing a chamber housing having a wall surrounding a chamber volume; disposing a pair of spaced apart discharge electrodes in the chamber volume; positioning a ceramic insulator in the volume and coupling the insulator to a portion of the housing wall; pressurizing the chamber with a gaseous gain media; establishing a voltage differential across the electrodes to create a discharge in the gain media and reducing a pressure differential across the wall portion to reduce deformation of the insulator.

In one implementation of the method, the voltage differential may be established via a conductor which passes through the wall portion. The pressure differential reducing step may include the sub-steps of: mounting a cover on the wall portion to establish a compartment and pressurizing the compartment. In a particular implementation, the wall portion may be formed with a plurality of orifices and a plurality of electrical conductors may be provided with each conductor extending through a respective orifice to pass electric current through the wall portion to one of the discharge electrodes. The gaseous gain media may be an excimer gas and the pressure differential may be reduced below 50 kPa.

DETAILED DESCRIPTION OF PREFERRED EMBODIMENTS

Figure 1:
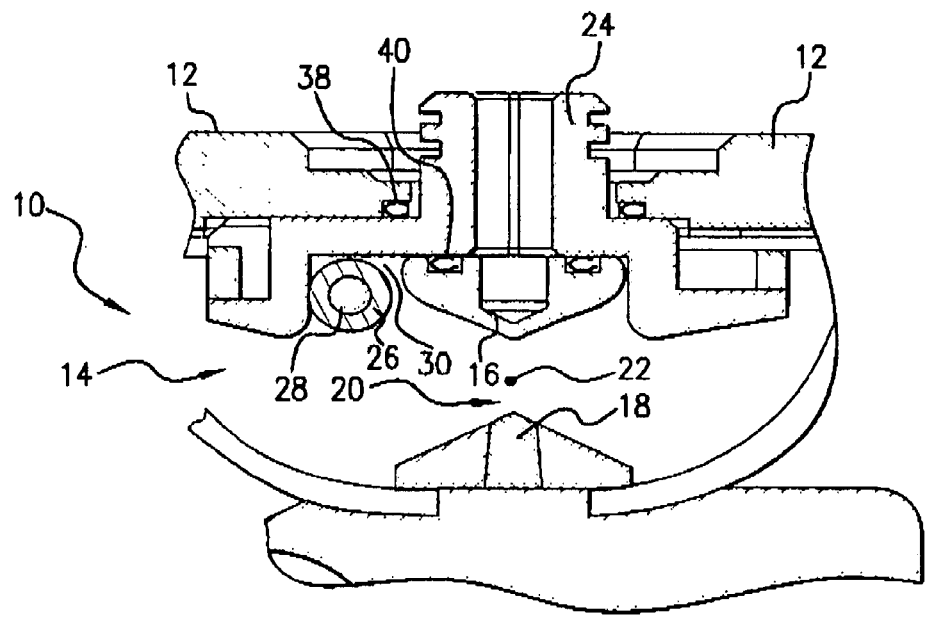
FIG. 1 shows a simplified, cross-sectional view of a gas discharge laser chamber taken transverse to a laser axis.

Referring initially to FIG. 1, portions of a gas discharge chamber for a pulsed laser, such as a KrF excimer laser, an XeF excimer laser, an XeCl excimer laser, an ArF excimer laser or molecular fluorine laser are shown and generally designated 10. The chamber 10 typically includes a two-part chamber housing 12 that may be made of a conductive, corrosion resistant material, e.g. nickel-plated aluminum, and is generally rectangular in construction with closed ends. With this structure, the housing 12 may surround a volume 14 which holds a laserable gas medium (see also FIG. 2).

The chamber 10 may also include an electrical discharge system having two elongated spaced apart electrodes 16, 18, one of which may be designated a cathode and the other an anode. With this arrangement, a gas discharge region 20 is established in the space between electrodes 16, 18 and includes the laser's beam axis 22 which extends substantially normal to the page for the chamber 10 shown in FIG. 1. Electrodes 16, 18 may be elongated, for example, to a length of about 40-80 cm and aligned in a direction generally parallel to the axis 22. Thus, the gas discharge region 20 for the chamber 10 shown is an elongated volume having a length approximating the length of the electrodes 16, 18 (i.e. 40-80 cm) and a somewhat rectangular cross section, which may be, for example, 3 mm wide by about 20 mm in the direction of electrode spacing for an XeF excimer laser. For the chamber 10, a gaseous laser media, which may include KrF, XeF, XeCl, ArF, $F_2$, etc. is disposed in the region 20 and maintained at a suitable pressure. As indicated above, for these systems, output pulse energy increases with the pressure of the gaseous gain media.

As further shown in FIG. 1, electrical contact between the electrode 16 and housing 12 is prevented by insulator 24 which may be made from a dielectric, e.g. ceramic material, e.g. high purity alumina. In one implementation, electrode 18 is maintained at a constant reference potential, e.g. ground potential, and electrode 16 can be biased relative to the reference potential to initiate an electric discharge in the gas discharge region 20. It is to be appreciated that other biasing schemes are possible. FIG. 1 also shows that the chamber 10 may include a preionization system having a hollow, dielectric tube 26, preionization electrode 28 and a conductive shim 30.

Figure 2:
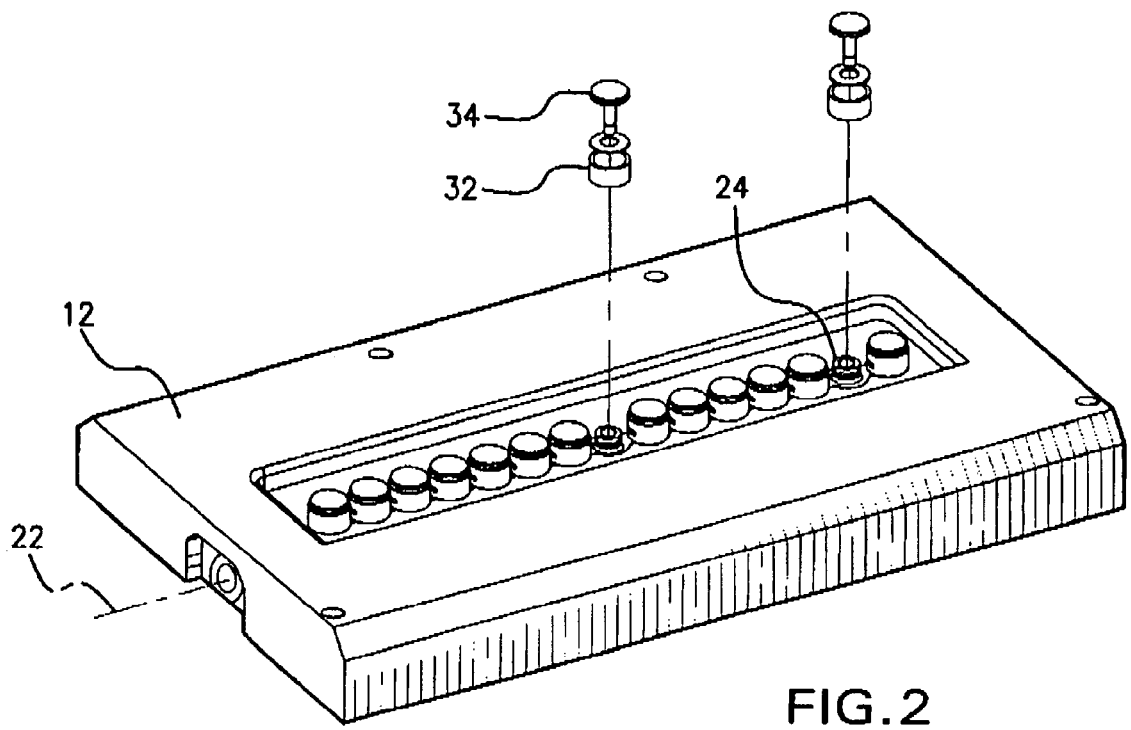
FIG. 2 is an exploded perspective view showing selected portions of one-half of the chamber housing to illustrate the electrical feed-through elements and insulator which pass through orifices formed in the chamber housing wall.

Cross-referencing FIGS. 1 and 2, an exemplary arrangement is shown to illustrate the passage of electrical current through the housing 12 to the electrode 16. As best seen in FIG. 2, the housing 12 is formed with a plurality of orifices (i.e. through-holes), in this case fifteen. Although a housing 12 with fifteen through-holes is shown, it is to be appreciated that more than fifteen and as few as one through hole may be used. The insulator 24 is formed with an equal number, in this case fifteen, cylindrical projections, with each projection extending through a respective orifice formed in the housing 12. FIG. 2 illustrates that a cylindrical cover 32, made from a dielectric, e.g. ceramic material, e.g. high purity alumina, is disposed over each insulator projection on the outside of the housing 12 and a conductive feed-through element 34 is passed through an opening in each projection. Thus, each feed-through element 34 passes through the wall of the housing and contacts the electrode 16. With this arrangement, a single conductor such as the plate 36 shown in FIG. 3 can be brought into electrical contact with each feed through element 34 to pass a relatively uniformly distributed current to the electrode 16. The plate 36, in turn, is electrically connected to a high-voltage power source (not shown).

As best seen in FIG. 1, a seal 38 is provided between the insulator 24 and housing 12 and a seal 40 is disposed between the electrode 16 and the insulator 24. Seals 38, 40 may be compressible seals, having a C cross-section and may be made of a tin-coated material allowing for exposure of the seal to fluorine gas with little or no degradation. With the above-described sealing arrangement, gaseous laser media is prevented from leaking from the discharge region 20 through the orifices formed in the housing 12. Thus, a chamber pressure may be maintained in the discharge region 20.

Figure 3:
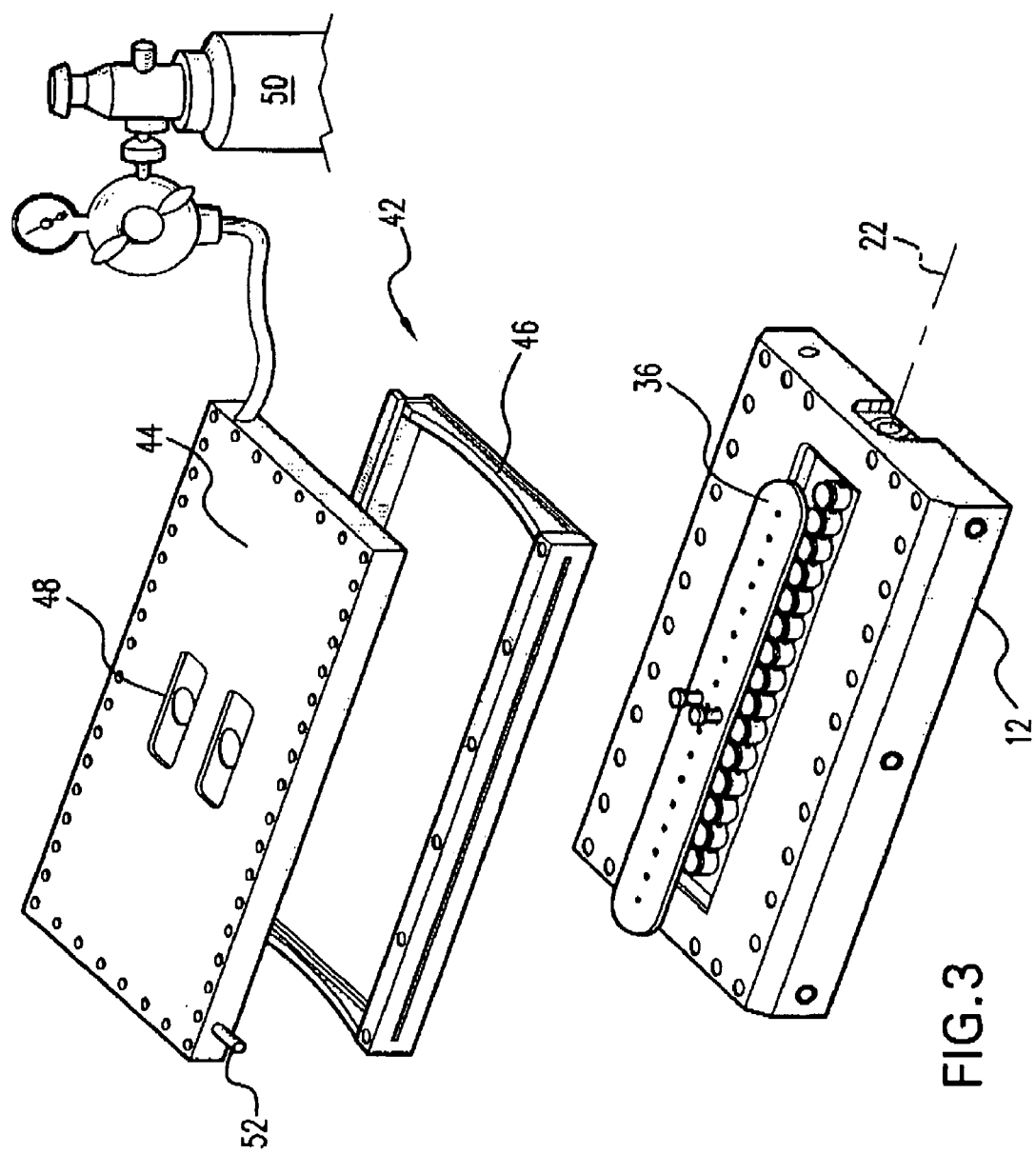
FIG. 3 is an exploded, perspective view illustrating an embodiment of a pressurized compartment having a one-piece cover.

FIG. 3 illustrates that a pressurized compartment 42 may be established on a portion of the outside surface of the wall of the housing 12 to reduce bowing of the housing wall (and in some cases deformation of the insulator 24) due to chamber pressure. For the embodiment shown in FIG. 3, an assembly including a one-piece cover 44 and mounting frame 46 may be used to establish the compartment 42 with the wall of the housing 12. As shown, the cover 44 may be formed with sealable through-holes 48 to allow conductors to pass through the cover 44 and carry current from a high voltage power supply (not shown) to the plate 36. To construct the compartment 42, the one-piece cover 44 may be fastened, e.g. bonded, mechanically fastened, etc., to the framing mount 46 which may be fastened, e.g. bonded, mechanically fastened, etc., to the housing 12. Typically, the one-piece cover 44 may be made of a dielectric material such as high purity alumina at a thickness of about 1" or 30% glass filled Ultem at a thickness of about 1-1.5". The mounting frame 46 may be made of aluminum, e.g. 6061 T6, or a combination of brass and aluminum.

Continuing with FIG. 3, a gas supply 50 may be provided for pressurizing the compartment 42. For example, the compartment may be pressurized with nitrogen gas, inert gases such as helium, argon, etc. or combinations thereof. By way of example, and not limitation, the gas discharge laser may be an excimer laser having a gaseous laser media containing XeF at a pressure in the range of 400-600 kpa and electrode voltage of 30-50 kV to generate pulses at a pulse energy of 200 mJ and pulse repetition rate of 6 kHz, and the compartment 42 may contain nitrogen gas at a pressure greater than 500 kPa. In some cases, a pressure differential less than about 50 kPa may be implemented. Moreover, the pressure in the compartment may exceed the chamber pressure and/or may be set of reduce deflection of the wall of the housing 12 below a selected value, e.g. 0.001".

As shown in FIG. 3, the cover 44 may be formed with an exit orifice 52 to allow gas to flow through the cover to continuously supply fresh gas to the compartment. Alternately, the exit orifice may be provided by forming a passageway (not shown) in the housing 12. For example, the exit orifice may include a check valve, restriction orifice, control valve, etc. In some cases, a "flowing pressure" may be used to remove the buildup of ozone in the compartment 42.

Figure 4:
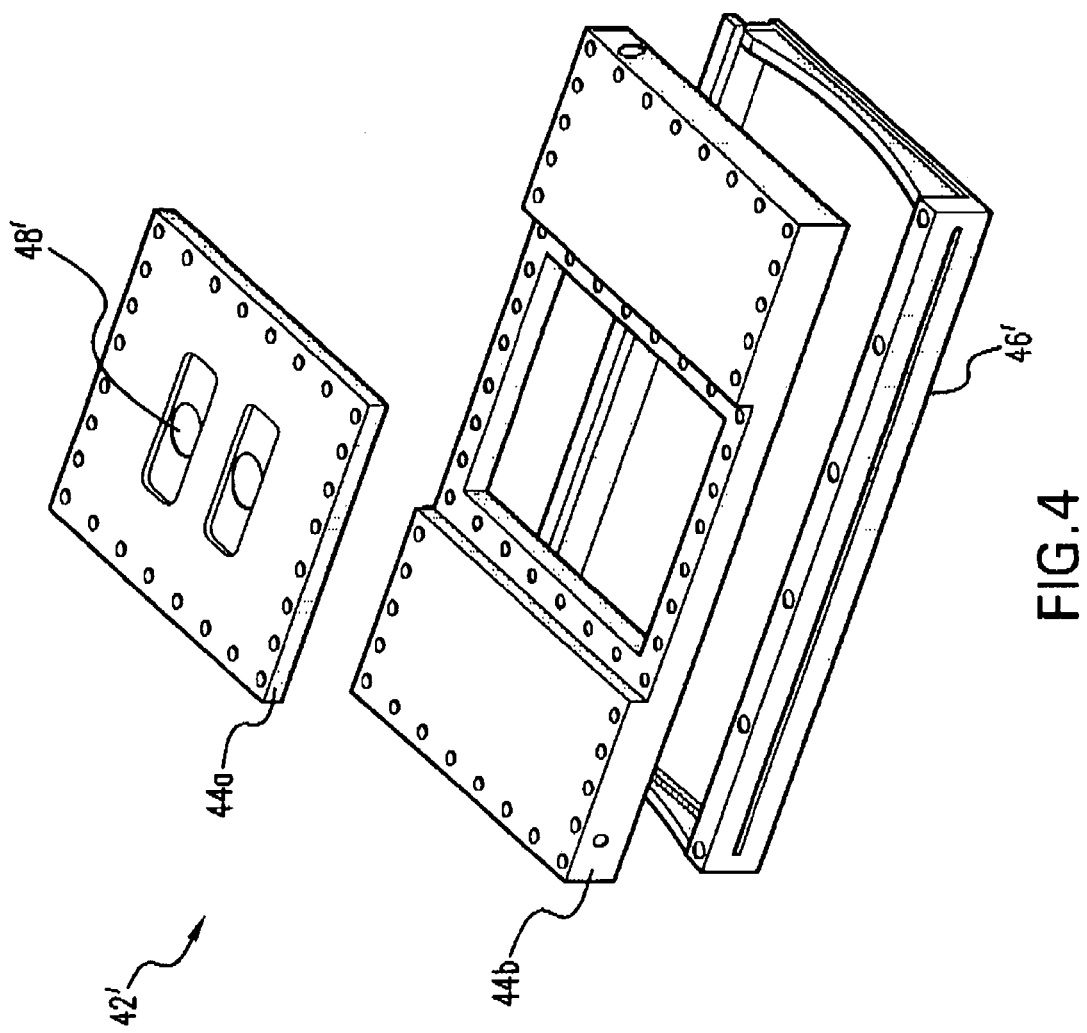
FIG. 4 is an exploded, perspective view illustrating an embodiment of a pressurized compartment having a two-piece cover.

FIG. 4 illustrates another embodiment of a pressurized compartment 42' which may be established on a portion of the outside surface of the wall of the housing 12 to reduce bowing of the housing wall (and in some cases deformation of the insulator 24) due to chamber pressure. For the embodiment shown in FIG. 4, an assembly including a two-piece cover having an inner section 44a and outer section 44b and mounting frame 46' may be used to establish the compartment 42' with the wall of the housing 12. As shown, the inner section 44a of the cover may be formed with sealable through-holes 48' to allow conductors to pass through the cover and carry current from a high voltage power supply (not shown) to the plate 36, feed-through elements 34 and electrode 16. To construct the compartment 42, the inner section 44a may be fastened, e.g. bonded, mechanically fastened, etc., to outer section 44b, the outer section 44b may be fastened, e.g. bonded, mechanically fastened, etc., to the framing mount 46 which may be fastened, e.g. bonded, mechanically fastened, etc., to the housing 12. Typically, the inner section 44a of the cover may be made of a dielectric material such as high purity alumina at a thickness of about 1" or 30% glass filled Ultem at a thickness of about 1". The inner section 44a may be a flat plate of uniform thickness as shown or may be flanged (not shown) being thinner at the edges and thicker in the center. By way of example, the outer section 44b and mounting fame 46 may be made of aluminum, e.g. 6061 T6, or a combination of brass and aluminum.

While the particular aspects of embodiment(s) described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present invention is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the Specification and/or in the claims and expressly given a meaning in the Specification and/or claims in the present Application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this Application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art.

What is claimed is:

1. A chamber for a gas discharge laser, the chamber comprising:
   a chamber housing having a wall, the wall surrounding a pressurizuble chamber volume;
   a pair of spaced apart discharge electrodes disposed in the chamber volume;
   a ceramic insulator disposed in the volume and coupled to a portion of the housing wall;
   a means for reducing a pressure differential across the wall portion to reduce deformation of the insulator wherein the reducing means comprises a cover mounted on the wall portion to establish a compartment and a gas supply for pressurizing the compartment.

2. A chamber as recited in claim 1 wherein the pressurized compartment contains nitrogen gas.

3. A chamber as recited in claim 1 wherein the gas pressure inside said chamber volume exceeds 500 kPa.

4. A chamber as recited in claim 1 wherein the pressure inside said compartment exceeds 584 kPa.

5. A chamber as recited in claim 1 wherein the gas discharge laser is an excimer laser.

6. A chamber as recited in claim 1 wherein the wall portion is formed with an orifice.

7. A chamber as recited in claim 1 wherein the wall portion is formed with a plurality of orifices and the chamber further comprises a plurality of electrical conductors, each conductor extending through a respective orifice to pass electric current through the wall to one of the discharge electrodes.

8. A chamber as recited in claim 1 wherein the insulator is positioned between one of the electrodes and the wall portion.

9. A chamber as recited in claim 1 wherein the cover is formed with an exit orifice to allow gas to flow through the cover to remove ozone buildup in the compartment.

10. A method for producing a laser beam, said method comprising the steps of:
    providing a chamber housing having a wall surrounding a chamber volume;
    disposing a pair of spaced apart discharge electrodes in the chamber volume;
    positioning a ceramic insulator in the volume and coupling the insulator td a portion of the housing wall;
    pressurizing the chamber with a gaseous gain media;
    establishing a voltage differential across the electrodes to create a discharge in the gain media; and reducing a pressure differential across the wall portion to reduce deformation of the insulator comprising the sub-steps of:

mounting a cover on the wall portion to establish a compartment; and pressurizing the compartment.

11. A method as recited in claim 10 wherein the voltage differential is establish via a conductor which passes through the wall portion.

12. A method as recited in claim 10 wherein the wall portion is formed with a plurality of orifices and a plurality of electrical conductors is provided with each conductor extending through a respective orifice to pass electric current through the wall portion to one of the discharge electrodes.

13. A method as recited in claim 10 wherein the gaseous gain media is an excimer gas.

14. A method as recited in claim 10 wherein the compartment pressure is greater than the chamber pressure.

* * * * *